US005831792A

United States Patent [19]
Ananth

[11] Patent Number: 5,831,792
[45] Date of Patent: Nov. 3, 1998

[54] SLIDER HAVING A DEBRIS BARRIER SURROUNDING A TRANSDUCER

[75] Inventor: Raju Seshu Ananth, San Jose, Calif.

[73] Assignee: Western Digital Corporation, Irvine, Calif.

[21] Appl. No.: 837,079

[22] Filed: Apr. 11, 1997

[51] Int. Cl.[6] .............................. G11B 5/60; G11B 5/187
[52] U.S. Cl. ......................... 360/103; 360/113; 360/122
[58] Field of Search ..................... 360/102, 103, 360/122, 126, 130.34, 113

[56] References Cited

U.S. PATENT DOCUMENTS

| | | | |
|---|---|---|---|
| 4,644,641 | 2/1987 | Verdone | 360/103 |
| 4,727,643 | 3/1988 | Schewe et al. | 29/603 |
| 4,837,924 | 6/1989 | Lazzari | 29/603 |
| 4,949,207 | 8/1990 | Lazzari | 360/119 |
| 5,034,838 | 7/1991 | Brock et al. | 360/122 |
| 5,099,372 | 3/1992 | Kadokura et al. | 360/130.34 |
| 5,327,638 | 7/1994 | Haines et al. | 29/603 |
| 5,353,180 | 10/1994 | Murray | 360/103 |
| 5,418,667 | 5/1995 | Best et al. | 360/103 |
| 5,452,166 | 9/1995 | Aylwin et al. | 360/122 |
| 5,473,486 | 12/1995 | Nepela et al. | 360/103 |
| 5,477,410 | 12/1995 | Fukuyama et al. | 360/130.34 |
| 5,490,025 | 2/1996 | Dorius et al. | 360/103 |
| 5,515,221 | 5/1996 | Gill et al. | 360/113 |
| 5,544,775 | 8/1996 | Kerth et al. | 216/65 |
| 5,574,606 | 11/1996 | Kimura | 360/122 |
| 5,578,342 | 11/1996 | Tran et al. | 427/131 |

FOREIGN PATENT DOCUMENTS

| | | | |
|---|---|---|---|
| 543637 | 5/1993 | European Pat. Off. | 360/122 |
| 3-127378 | 5/1991 | Japan | 360/130.34 |
| 4-366408 | 12/1992 | Japan | 360/122 |
| 6-12622 | 1/1994 | Japan | 360/122 |
| 6-28651 | 2/1994 | Japan | 360/122 |

*Primary Examiner*—Brian E. Miller
*Attorney, Agent, or Firm*—Leo J. Young; W. Cheis Kim

[57] ABSTRACT

A debris barrier surrounds a transducer for preventing microscopic debris from migrating near the magnetic poles of the transducer in a disk drive. In one embodiment, the debris barrier is composed of a barrier wall and a barrier cavity and used with a thin film transducer. The barrier elements are disposed within a region of an air bearing surface surrounding the poles of the transducer such that, during operation, debris is collected within and around the barrier thereby preventing the debris from migrating to the pole region. By eliminating debris around the transducer poles, this invention eliminates errors caused by the debris and thereby provides a more reliable disk drive. In another embodiment, the debris barrier is used with multiple transducers. In yet another embodiment, the debris barrier is used with a planar structure transducer having planar poles.

11 Claims, 10 Drawing Sheets

SLIDER HAVING A DEBRIS BARRIER SURROUNDING A TRANSDUCER

BACKGROUND OF THE INVENTION (1) Field of the Invention

This invention relates to the field of air bearing sliders used in hard disk drives. Specifically, this invention relates to air bearing sliders that provide more consistent operating characteristics in an environment having debris and other particulate contamination.

(2) Description of the Prior Art and Related Information

Within hard disk drives that use magnetic recording media, an air bearing slider containing a magnetic transducer flies over a spinning magnetic disk (e.g., usually a circular platter). This magnetic transducer is typically fabricated as part of a slider or head which itself is mounted in a head stack assembly. As recording density is increasing steadily, it has become necessary within the field of hard disk drives to "fly" the magnetic transducer (and air bearing slider) ever closer to the magnetic disk. In so doing, the flying height of the transducer with respect to the magnetic disk needs to be precisely maintained during read and write operations of the disk drive. Small sized debris (e.g., sized approximately between 0.1 and 1.0 um) within the disk drive environment can collect on or around the magnetic poles of the transducer. This debris can alter the flying height of the transducer and thereby cause data bit errors within the signals used during read and write operations of the disk drive. Accordingly, it would be advantageous to provide a mechanism to reduce debris content on and around the magnetic poles of the transducer.

Debris within the disk drive environment that interferes with transducer activity can be classified into different types, among which are organic and inorganic (e.g., metallic) debris. Organic debris migrating onto the poles of the transducer can alter the flying height of the transducer by altering its geometry and thus altering its flying characteristics. By altering the flying height of the transducer, bit errors can result in the disk drive's bit stream reducing the overall reliability of the disk drive. Organic debris on the transducer can also add stress to the slider mechanisms thereby reducing the overall reliability of the disk drive. Metallic debris on the transducer has the discussed disadvantages of organic debris, but further, metallic debris can migrate onto the transducer poles causing shorts between them, again causing bit errors in the data streams. Therefore, inorganic debris can readily lead to performance degradation within the disk drive and also reduce its overall reliability.

The amount of debris content within a disk drive can be attributed to a number of factors. One factor that increases debris content on and around the transducer is attributed to the process of pole shaping. To further increase recording density, the poles of a transducer can optionally be shaped in order to reduce bit errors. However, the process of pole shaping generally leaves a depression around the transducer poles which can generate negative pressure and act as a trapping place for organic and inorganic (e.g., metallic) particles of debris and all other matter which can be transferred to the poles.

Accordingly, what is needed is a slider that allows for low and maintained flying height, but avoids the problems that occur when small particles of debris migrate to the transducer on the slider.

SUMMARY OF THE INVENTION

This invention can be regarded as an air bearing slider containing a transducer for a hard disk drive. The air bearing slider includes an air bearing surface, a depressed region in the air bearing surface, and first and second magnetic poles. Each magnetic pole has a pole tip region extending away from the depressed region. The slider also includes a barrier wall on the air bearing surface surrounding the depressed region and a barrier cavity in the air bearing surface disposed adjacent to the barrier wall wherein the barrier wall is between the barrier cavity and the depressed region, the barrier cavity for collecting debris and the barrier wall for preventing debris from migrating into the depressed region. Significantly, the barrier wall and the barrier cavity can completely surround the magnetic poles and the depressed region or only partially surround the magnetic poles and the depressed region.

This invention can also be regarded as an air bearing slider containing a planar structure transducer for a disk drive. The slider includes an air bearing surface and planar magnetic poles disposed adjacent and parallel to the air bearing surface. The slider also includes a barrier cavity cut into the air bearing surface and surrounding the planar magnetic poles where the barrier cavity is for collecting migrating debris and preventing debris from migrating to the planar magnetic poles and altering flying height characteristics of the slider.

This invention can also be regarded as an air bearing slider containing multiple transducers for a hard disk drive. The air bearing slider includes an air bearing surface, and magnetic poles oriented perpendicular to the air bearing surface. The slider also includes a magneto-resistive element disposed adjacent to the magnetic poles and a shield disposed adjacent to the magneto-resistive element wherein the magneto-resistive element is located between the shield and one pole of the magnetic poles, the shield and the one pole for shielding the magneto-resistive element. The slider also includes a barrier cavity etched into a top surface of the shield for collecting debris therein and preventing debris from migrating to the magneto-resistive element.

DETAILED DESCRIPTION OF THE PREFERRED EMBODIMENTS

Figure 1:
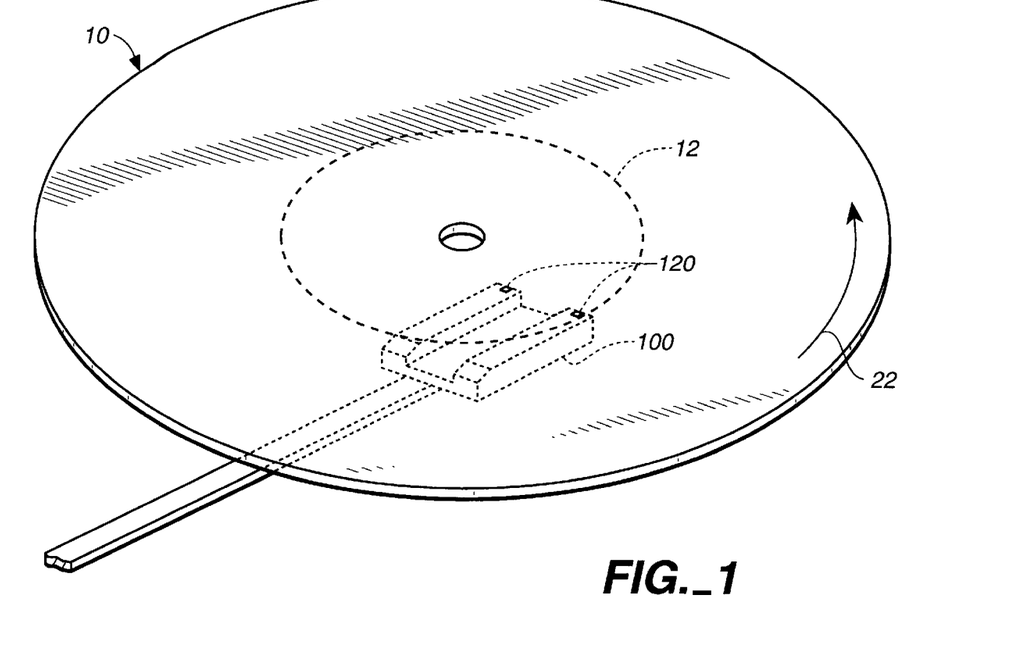
FIG. 1 is a perspective view which depicts a slider of this invention flying over a magnetic disk of a disk drive.

In FIG. 1, a slider 100 includes a pair of thin film transducers 120. Within a given slider 100, only one of the transducers 120 is operative. The slider 100 flies adjacent to a surface of a magnetic disk 10 which moves in a primary direction of motion as indicated by arrow 22. In this configuration, the transducers 120 are mounted on the back of the slider 100 with respect to the relative movement of the slider 100 to the surface of disk 10. The operative transducer 120 flies over a circular track 12 of disk 10.

Figure 2A:
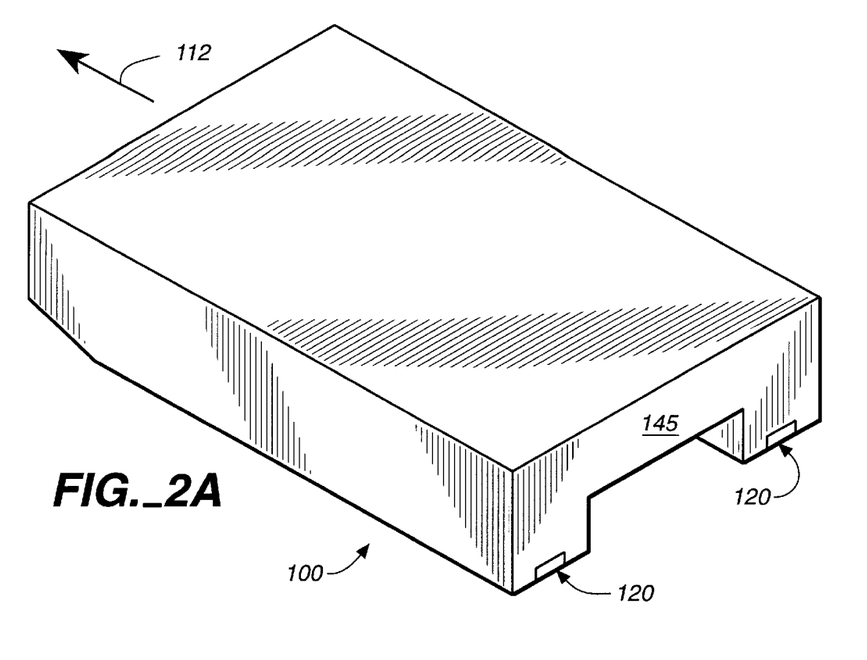
FIG. 2A is an upper perspective view of the slider of FIG. 1.
Figure 2B:
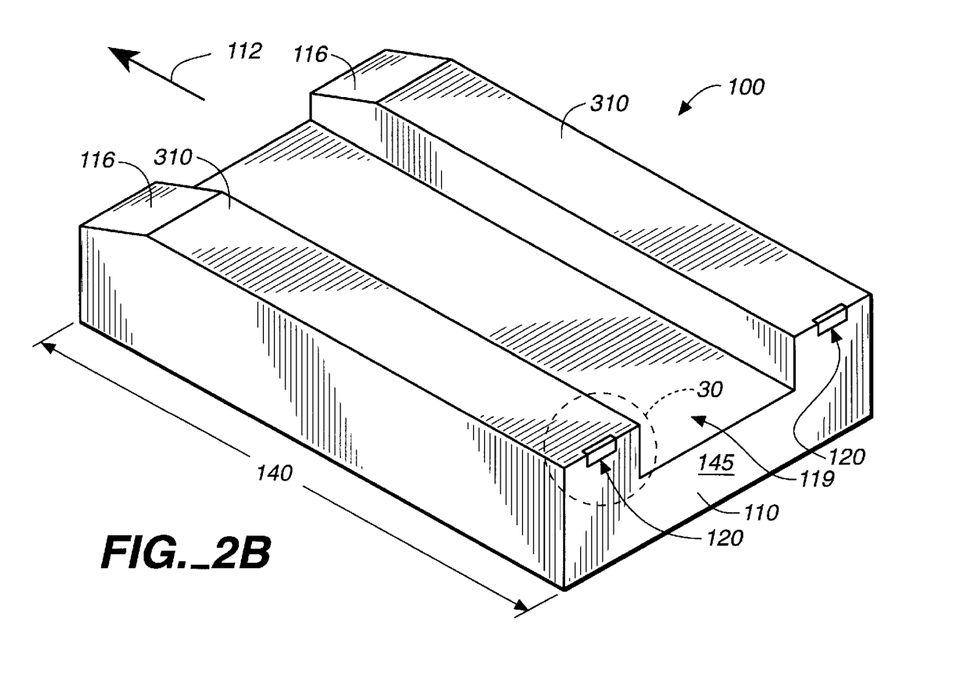
FIG. 2B is another perspective view of the slider of FIG. 2A which shows the air bearing surfaces on the bottom of the slider and also shows the transducers.

In FIG. 2A, the top and back portion of slider 100 are shown including the location of the two transducers 120. In FIG. 2B, two air bearing surfaces (ABS) or rails 310 are included on the under side of slider 100. A transducer 120 of this invention is associated with each ABS of slider 100 as shown. During read and write operations, a magnetic medium (such as disk 10) passes across the air bearing surface 310.

In FIG. 2B, the air bearing slider 100 is approximately 40–60 mils wide and approximately 50–80 mils long (dimension 140) and contains a slider member 110 which includes the thin film transducers 120 located along the rails 310 which lie on either side of the slider member 110. Each rail 310 contains a taper 116. A central recessed region 119 is also located between the two rails 310. Each transducer 120 contains a set of internal coils which magnetize magnetic poles of the transducer 120 when current flows through the coils. Internal to the slider 100, the coils form radius layers and make connection via a semiconductor process. In the transducers of this invention, coiling is generally performed by a well known plating process. The thin film transducers 120 are deposited on the trailing end of the air bearing slider 100 with respect to the flying direction 112 and are positioned over a track 12 of disk 10 during reading and writing.

Figure 3:
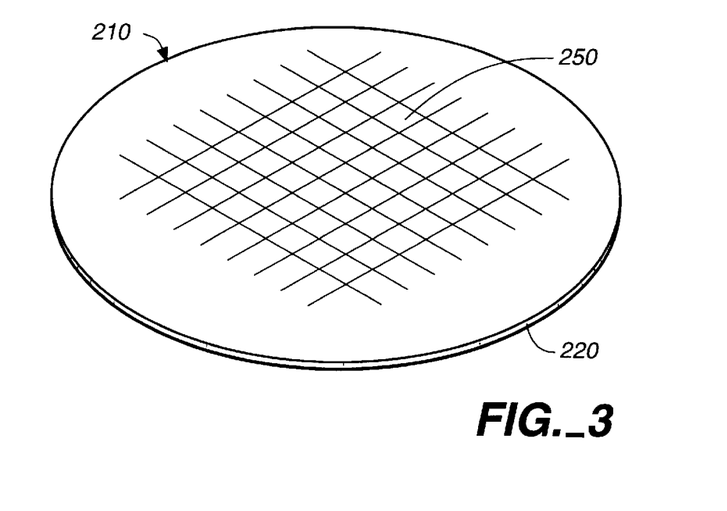
FIG. 3 illustrates a semiconductor substrate used in one step of a process used in slider fabrication.

In FIG. 3, a thin film substrate 210 used in one step of the fabrication process of the sliders 100 of this invention is shown. In the substrate 210, the unshaped poles of the thin film transducers 120 are fabricated in conjunction with the fabrication of the slider 100. The slider fabrication takes place in layers using well known thin film fabrication processes. Individual sliders 250 are fabricated in thin film substrate 210 with an orientation such that the length of the slider (length 140 of FIG. 2B) corresponds to the thickness 220 of the substrate (or wafer) 210. In this way, the poles of the transducer are built-up as layers of substrate 210; the substrate 210 is then cross sliced or divided into individual sliders, as shown. The back end surface 145 of the slider 100 (FIG. 2B) corresponds to the top surface of substrate 210 (FIG. 3). Once the sliders are separated, a second fabrication process involving etching is used to construct the debris barrier in accordance with this invention. Optionally, another etching step can be used to shape the transducer poles, and if this step is used, can optionally be done in conjunction with debris barrier fabrication. It is appreciated that the pole shaping fabrication step can be performed using a number of well known etching processes, for instance, ion milling or focused ion beam (FIB) milling.

Figure 4:
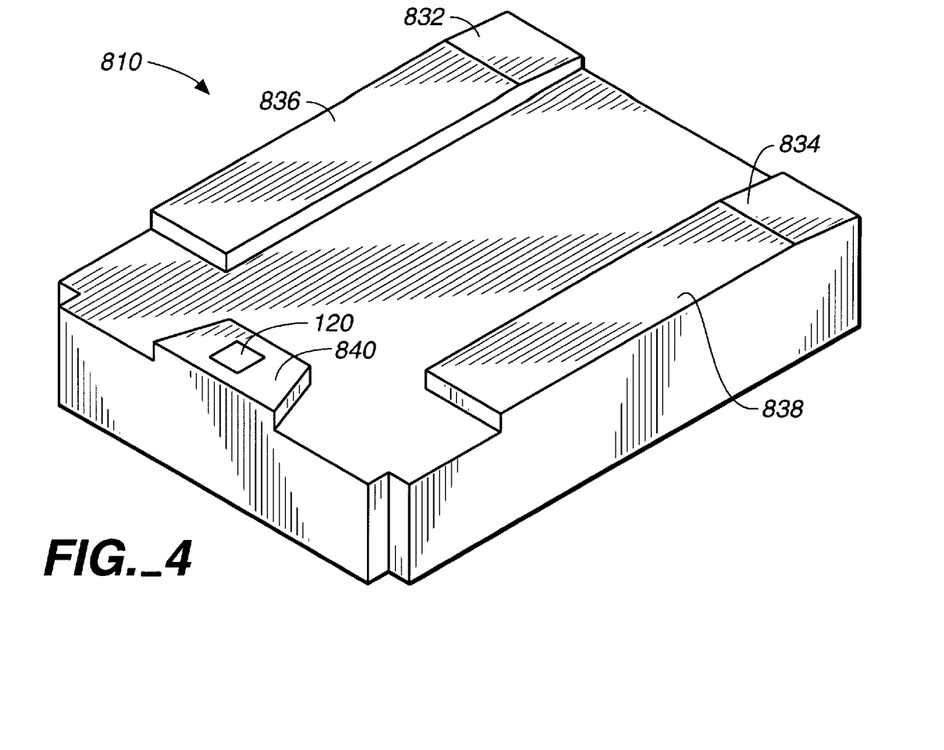
FIG. 4 illustrates a tripad air bearing slider used in an embodiment of this invention.

In FIG. 4, an alternative tripad slider configuration 810 that can be used in accordance with this invention is shown. This tripad slider 810 has three air bearing surfaces 836, 838, and 840. Also shown are tapers 832 and 834. This type of tripad slider is described in more detail in U.S. Pat. No. 5,473,485. Transducer 120 is shown associated with pad 840.

Figure 5A:
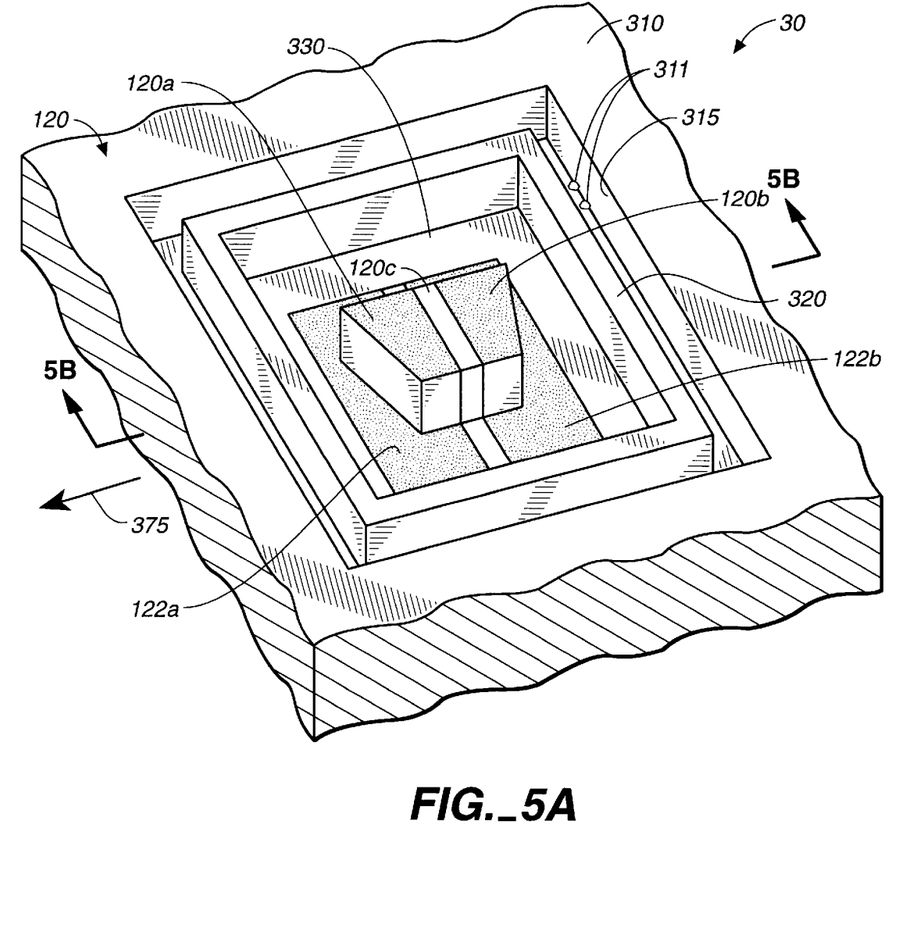
FIG. 5A is an enlarged perspective view of the indicated portion of FIG. 2B and shows a transducer with a completely surrounding debris barrier in accordance with one embodiment of this invention.

In FIG. 5A, an enlarged perspective view of a portion 30 of the air bearing slider 100 of FIG. 2B is shown. This enlarged portion 30 illustrates elements of thin film transducer 120 implemented in accordance with one embodiment of this invention. The transducer flight direction 375 is also shown. The transducer 120 includes magnetic poles 120a and 120b and a gap 120c. Optionally, the poles 120a and 120b can be shaped as shown in FIG. 5A, but they need not be shaped in accordance with this invention. The region immediately adjacent to the poles 120a and 120b, and containing the gap 120c, is called the pole region 330 and is generally recessed if shaping is done.

In accordance with this invention, a debris barrier is disposed on the transducer 120 and completely surrounds the pole region 330. In one embodiment, the debris barrier is composed of a barrier wall 320 and a barrier cavity 315 which together act to prevent the migration of debris into the pole region of transducer 120. The barrier cavity 315 completely surrounds the pole region 330 as does the barrier wall 320, both with a rectangular geometry in one embodiment. During an etching process, the barrier wall 320 and the barrier cavity 315 are etched into the transducer 120 in order to prevent debris migration into the pole region 330 which is an area of negative pressure, if recessed. The air bearing surface 310 surrounds the barrier cavity 315.

The poles 120a and 120b of this invention can be fabricated from a relatively magnetically soft material (e.g., nickel-iron alloy) while the remainder of the transducer, e.g., gap region 120c, the material below recessed region 330, the barrier wall 320, and the material below the barrier cavity 315, can be fabricated from magnetically inactive Alumina ($Al_2O_3$) material.

In operation, when mounted in a head stack assembly, slider 100 with transducer 120 flies over a spinning magnetic disk at a distance of about 1–2 micro inches. Organic and inorganic (e.g., metallic) debris 311 from the disk environment are restricted from migrating into the depressed pole region 330 by the barrier wall 320 and barrier cavity 315. In particular, debris tends to lodge in the barrier cavity 315 (see also FIG. 5C) and become trapped there. Since the barrier wall 320 and barrier cavity 315 are positioned approximately 40 micro inches away from the poles, 120a and 120b, and since the transducer 120 is flying approximately 1–2 micro inches from the magnetic disk 10, barrier wall 320 and cavity 315 of this invention do not measurably alter the magnetic field characteristics of the transducer 120 during its reading or writing operations.

Figure 5B:
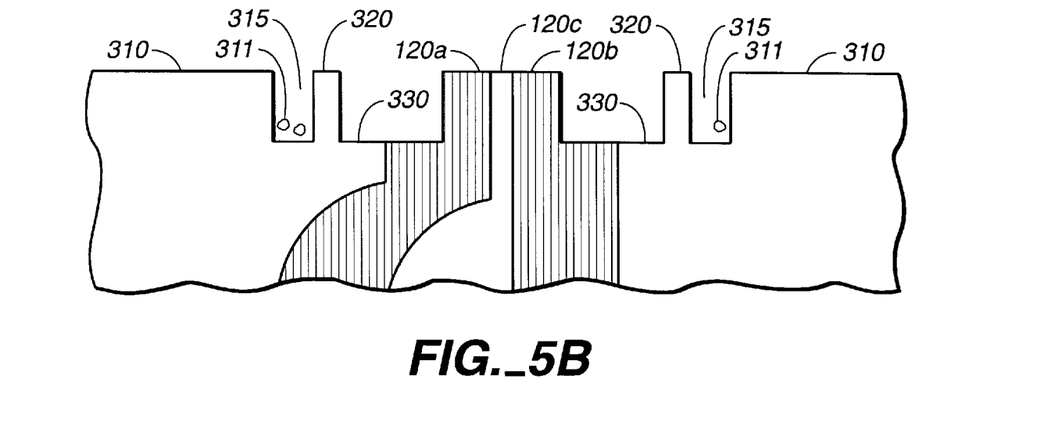
FIG. 5B is a cross sectional view of the transducer and debris barrier shown in FIG. 5A.

In FIG. 5B, barrier cavity 315 and barrier wall 320 are shown. The cross sectional view is described from right to left. With respect to the air bearing surface 310, the barrier cavity 315 of this invention is a channel etched into the air bearing surface 310 and is approximately 1 um recessed in depth and approximately 1–3 um wide. Adjacent to the barrier cavity 315 is a barrier wall 320 having a top surface that is approximately 1 um above the bottom of barrier cavity 315. The barrier wall 320 is approximately 1–3 um wide. The bottom surface of generally recessed pole region 330 is approximately 1 um below the top surface of barrier wall 320. A cross section of the shaped pole 120a is also shown in FIG. 5A adjacent to gap 120c and pole 120b. To the right of pole 120b, a cross section of generally recessed pole region 330 is shown adjacent to barrier wall 320 which is adjacent to barrier cavity 315 which is itself adjacent to air bearing surface 310. In approximate dimensions, pole 120a and pole 120b are each 3–4 um wide (e.g., across) and gap 120c is approximately 0.25 um across. The height of the poles 120a and 120b above the surface of recessed region 330 is approximately 1 um (approximately 40 micro inches). However, other dimensions can be used in accordance with the scope of this invention.

Figure 5C:
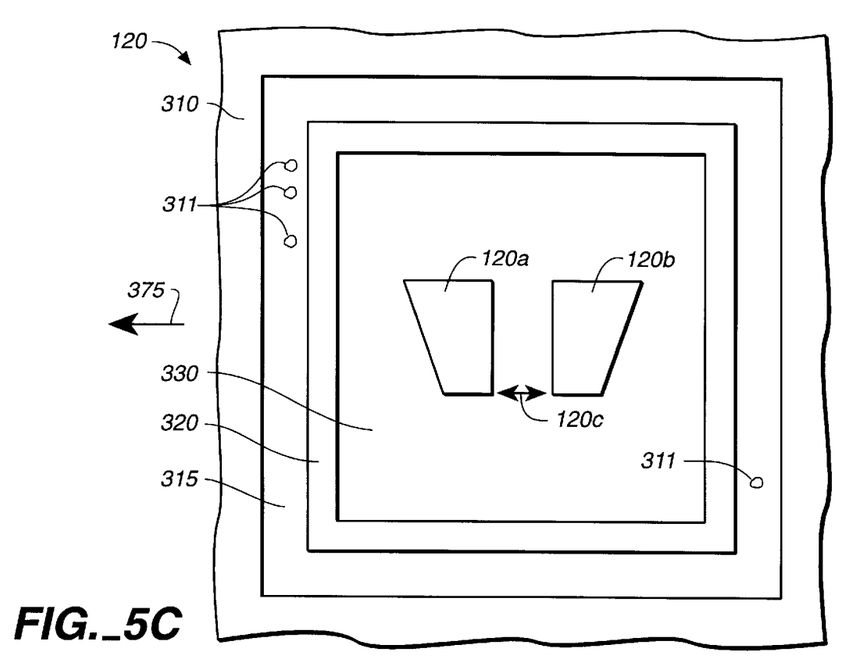
FIG. 5C is a plan view of the transducer and debris barrier shown in FIG. 5A.

For clarity, FIG. 5C illustrates a plan view of the transducer 120 of FIG. 5A including the depressed pole region 330 including the poles 120a and 120b and the gap 120c. Surrounding the pole region 330 is the barrier wall 320, the barrier cavity 315 and air bearing surface 310. For illustration, several small sized particles of debris 311 are shown located within the debris cavity 315. These trapped particles 311 are approximately 0.1–2.0 microns in diameter but can vary in size range depending on the dimensions of the barrier cavity 315. The transducer flight direction 375 is also shown.

In the transducer embodiment shown in FIGS. 5A–5C, the depth of barrier cavity 315 and the depth of the generally recessed pole region 330 are approximately the same. Optionally, a pole shaping etching process can be used both to remove material above the pole region 330 and to generate the barrier cavity 315 and barrier wall 320 regions. At a depth of 1 um, the barrier elements 315 and 320 cause no measurable magnetic interference to the poles of the transducer. In an alternative embodiment, if a separate etching step process is used to fabricate the barrier wall 320 and barrier cavity 315, then the barrier cavity 315 can be fabricated with a different depth compared to the depth of the pole region 330.

Figure 6:
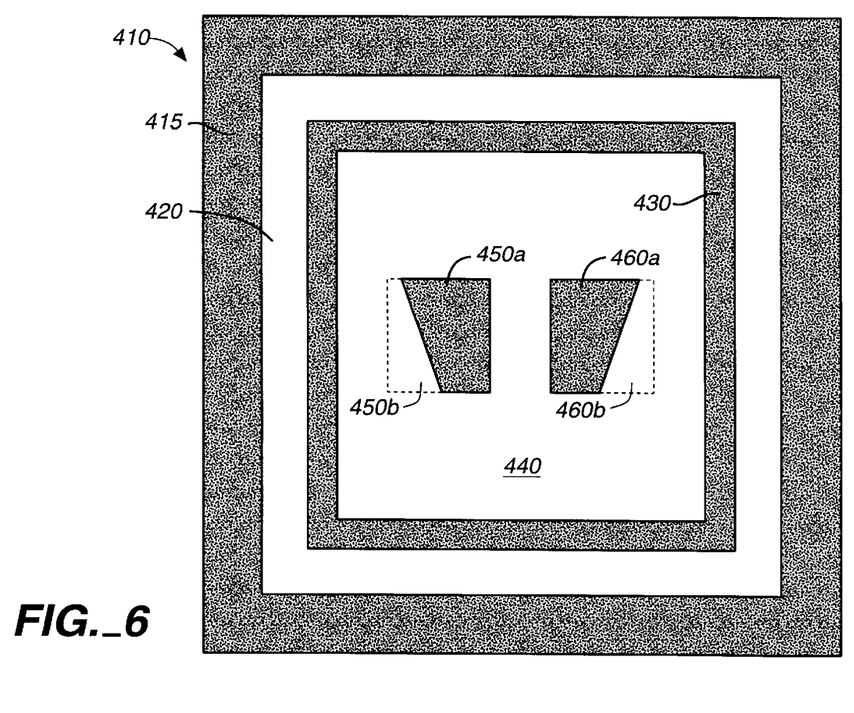
FIG. 6 illustrates a mask pattern used during an etching step for making the debris barrier of this invention.

In FIG. 6, a mask pattern 410 is shown that can be used in accordance with this invention during an etching step to fabricate the barrier elements of transducer 120. The mask pattern 410 of FIG. 6 illustrates a second of two cases discussed below, with the first case using a slightly modified mask pattern. The darkened pattern portions of mask 410 represent areas where the etching step of this invention does not remove material. In a first case, where pole shaping is not used, all of region 440 of mask 410 is darkened and region 420 is removed representing the barrier cavity 315. The first case does not etch the pole region 330. In a second case, pole shaping can be performed in conjunction with the fabrication of the debris barrier. In the second case, with respect to pole 120a, region 450b is etched away but region 450a remains. With respect to pole 120b, region 460a remains but region 460b is etched away. Mask region 440 is removed by etching to represent the depressed pole region 330. Mask region 430 remains representing the barrier wall 320. Region 420 is removed representing the barrier cavity 315. Mask region 415 represents the air bearing surface 310 which remains.

Figure 7A:
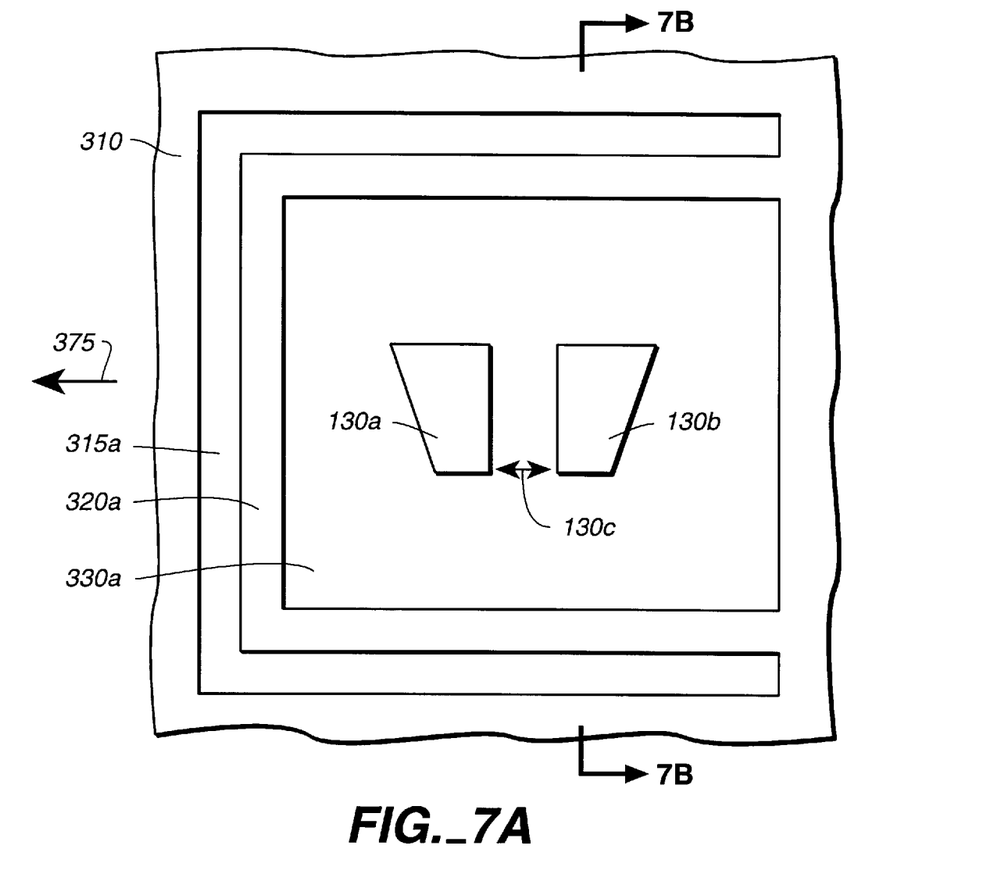
FIG. 7A illustrates a plan view of a transducer having a partially surrounding debris barrier in accordance with a second embodiment of this invention.
Figure 7B:
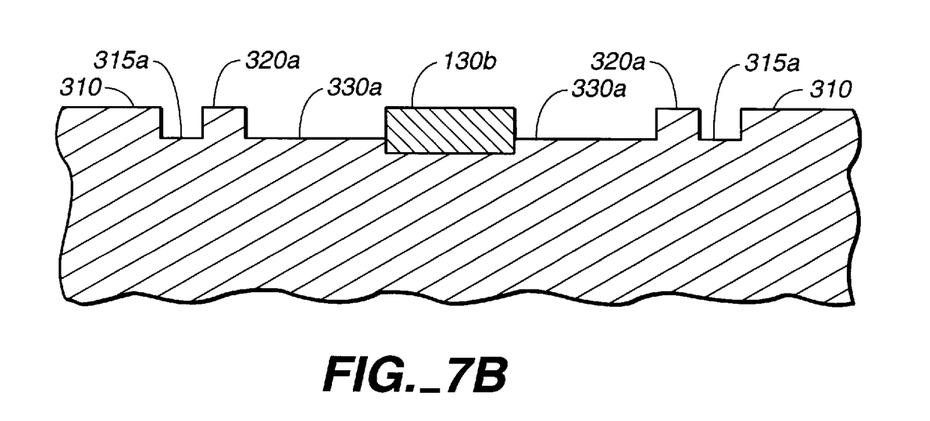
FIG. 7B shows a cross section of the transducer and debris barrier of FIG. 7A.

FIG. 7A and FIG. 7B illustrate a plan view and a cross sectional view, respectively, of a transducer 130 of an alternative embodiment of this invention. Transducer 130 is analogous to transducer 120, except the barrier wall 320a and the barrier cavity 315a of this embodiment do not completely surround its pole region 330a. In the direction of the slider flight, as shown by arrow 375, debris is expected to migrate from the front of the transducer 130. Therefore, the barrier cavity 31 5a and the barrier wall 320a are disposed to surround the front of the transducer 130 to restrain debris migration into the pole region 330a. Since substantial debris migration originating from the back of transducer 130 is not expected, this embodiment eliminates the barrier wall 320a and barrier cavity 315a from this back portion. What remains is a substantially "U" shaped barrier 320a, 315a. An advantage of this embodiment is that often it is difficult to precisely fabricate barrier elements near the back of the transducer. This transducer 130, while not offering the same level of debris protection as transducer 120, does instead offer slightly higher manufacturing throughput. In FIG. 7B, the cross sectional view of FIG. 7A, is in effect analogous to the cross sectional view of FIG. 5B.

Figure 8:
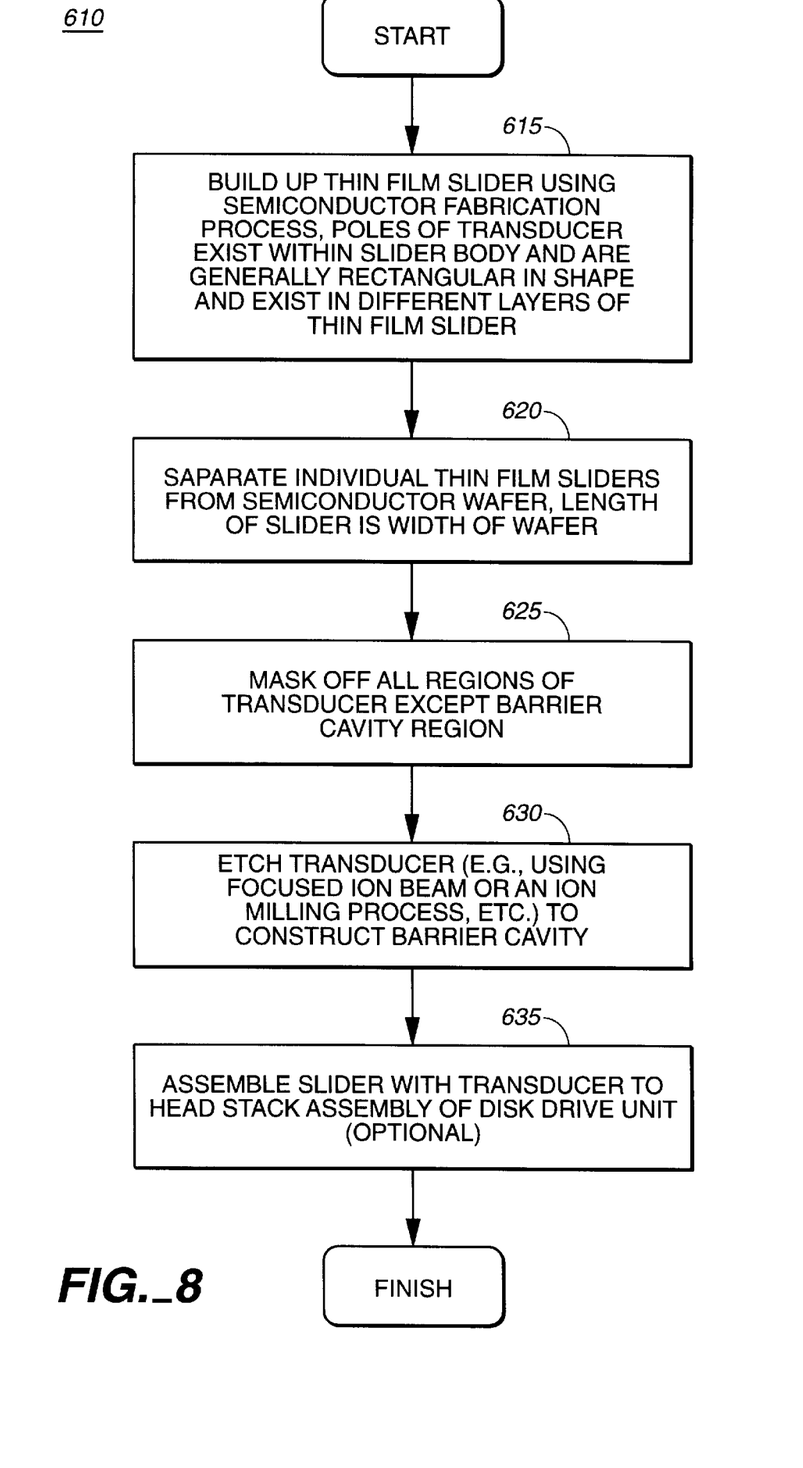
FIG. 8 illustrates steps of a fabrication process used in accordance with this invention for making a slider containing a transducer with a debris barrier.

FIG. 8 illustrates a fabrication process 610 used in accordance with one embodiment of this invention whereby an etching step is performed which constructs the debris barrier of this invention. At step 615, a semiconductor thin film fabrication process is used to build up the layers of the thin film slider 100. The magnetic poles of the transducer (120 or 130) are built up in the layers of the thin film slider and are generally rectangular in shape at this step. At step 620, the multiple sliders fabricated within a single thin substrate are separated and, at this point, the thickness of the substrate is also the length of the slider. In other words, the back end surface (145 of FIG. 2B) of the slider is the top surface of the substrate.

At step 625, a mask pattern is used to mask off regions of the transducer where etching is not to occur. In the first case, the only region that is not masked off is the region where the barrier cavity is to be formed. Optionally, in a second case, pole shaping occurs in conjunction with formation of the debris barrier. In this second case, certain regions of the transducer's poles, the barrier wall, and the air bearing surface 310 are masked off at step 625 and are to remain after etching. The other portions will be etched away to a depth of 1 um. At step 630, focused ion beam milling or ion milling is used to perform etching of the transducer surface as indicated by the mask used at step 625. Any material not masked off on the transducer surface is removed down to about 1 um in depth. With respect to the second case, during step 630, not only are the poles of the transducer shaped, but the barrier cavity 315 and the barrier wall 320 of this invention are produced. At step 635, the etched transducer (120 or 130) with slider are optionally mounted within a head stack assembly of a disk drive unit.

Figure 9:
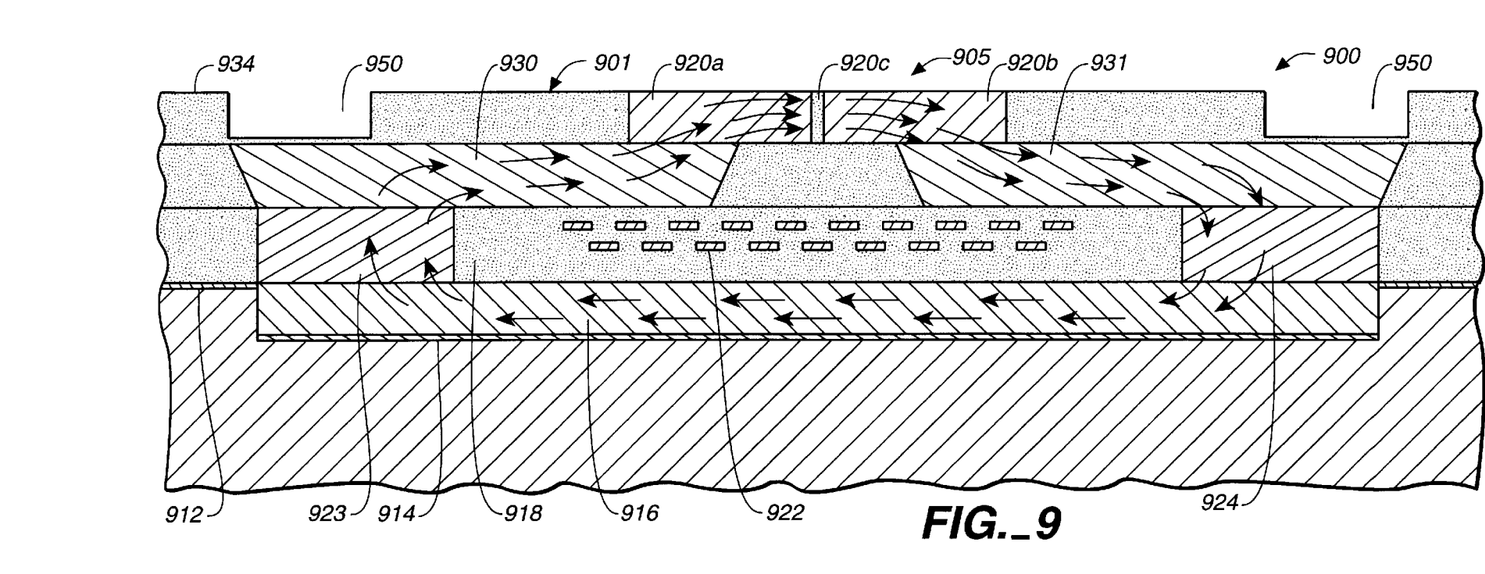
FIG. 9 is a cross sectional view of an air bearing slider containing a planar structure transducer with a debris barrier in accordance with another embodiment of this invention.

In FIG. 9, a portion 900 of an air bearing slider containing a planar structure transducer 905 is shown implemented in accordance with U.S. Pat. No. 4,837,924 but, in addition, having a barrier cavity 950 etched to surround the planar magnetic poles 920a and 920b. Gap 920c is located between planar poles 920a and 920b. Planar poles 920a and 920b and gap 920c all exist within a single layer or common plane of transducer 905. Planar poles 920a and 920b are adjacent and parallel to an air bearing surface 901. Coil 922 and insulating layer 918 are also shown in FIG. 9. The barrier cavity 950 (approximately 1–3 um wide and 1 um deep) of this invention functions to collect debris and prevents the debris from migrating to the planar poles 920a and 920b. Barrier cavity 950 also functions to prevent debris from collecting on and around the surface of the slider which could alter its flying height. Also, the barrier cavity 950 can completely surround the planar magnetic poles 920a, 920b analogous to FIG. 5A or only partially surround the planar magnetic poles 920a, 920b analogous to FIG. 7A.

In FIG. 9, also shown are bard protective film 934, magnetic films 930 and 931, insulating film 912, magnetic contact pads 923 and 924, magnetic film 916 and conductive film 914.

Figure 10A:
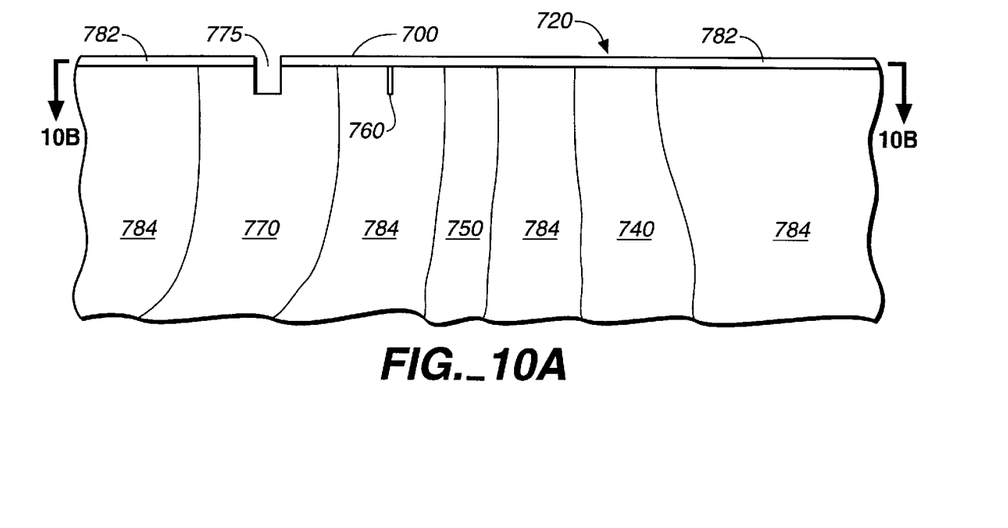
Figure 10A is a cross sectional view of a portion of a slider containing multiple transducers with a debris barrier in accordance with another embodiment of this invention.
Figure 10B:
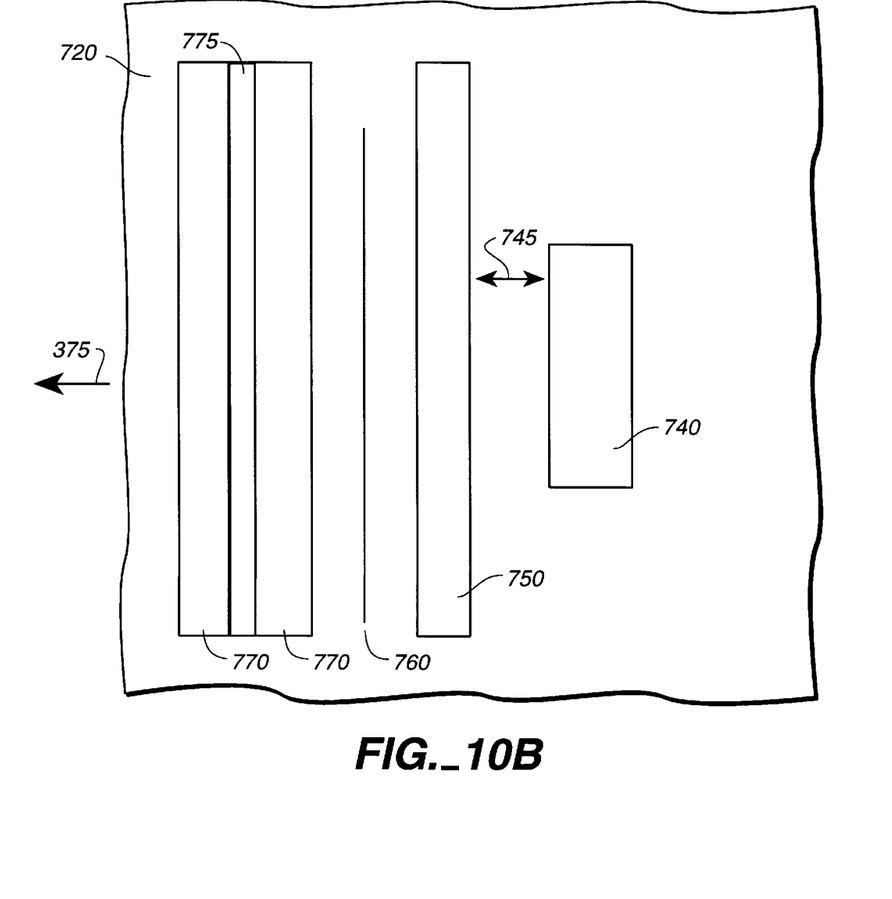
FIG. 10B is a plan view of the portion of FIG. 10A taken along line 10B.

In FIG. 10A and FIG. 10B, a portion of an air bearing slider containing a multiple transducer 720 is shown. FIG. 10A and FIG. 10B illustrate a debris barrier that is used in accordance with this embodiment. Transducer 720 of this embodiment contains an MR reading element 760 and a set of magnetic poles 750 and 740 separated by a gap 745. Magnetic poles 750 and 740 are oriented perpendicular to air bearing surface 700. The MR reading element 760 is approximately 1–2 micro inches thick, has a height of about 1.2 microns, and a length of approximately 1.6 microns. Since the magnetic poles of transducer 720 do not read, they do not generally require shaping. However, shaping can be optionally performed in some instances to improve on and off track performance. Also, an etching step can be used to precisely shape the MR element 760. Pole 750 and pole 740 are used for writing only and the length of pole 740 is adjusted to the required track width. The MR element 760 is positioned between pole 750 and shield 770 and pole 750 also acts as an MR shield. The transducer flight direction 375 is also shown. Shield to shield spacing (e.g., measured between shield 770 and pole 750) is approximately 2.4 microns. Further, read to write spacing (e.g., measured between MR element 760 and the middle of gap 745) is approximately 3.0 microns.

In accordance with this transducer 720, a barrier cavity 775 is etched through the top surface of shield 770 to collect debris. The barrier cavity 775 can be cut into shield 770 during an etching step in the fabrication of transducer 720. The shield 770, and thus the surfaces of barrier cavity 775 and the magnetic poles 740 and 750 are composed of a soft magnetic nickel-iron alloy. Barrier cavity 775 primarily prevents debris from migrating to poles 750 and 740 by trapping such particles and thereby prevents debris from interfering with the read and write processes or with the flying height.

FIG. 10A illustrates a cross sectional view of the shield 770 and barrier cavity 775. The barrier cavity is approximately 1–3 urn wide and approximately 1 um deep. Portions 784 are composed of Alumina. A thin, e.g., 70–80 angstrom, carbon layer 782 is disposed on the top surface. Debris collection with respect to transducer 720 is advantageous because debris caught in or striking transducer 720 causes friction along the surface of the MR element 760. This friction is translated into heat energy which can alter the resistive nature of the MR element 760 and thus improperly mimic a data bit. By collecting debris in the debris cavity 775, this embodiment of this invention reduces thermal asperity of the MR element 760 and thereby provides a more robust, reliable disk drive.

Figure 10C:
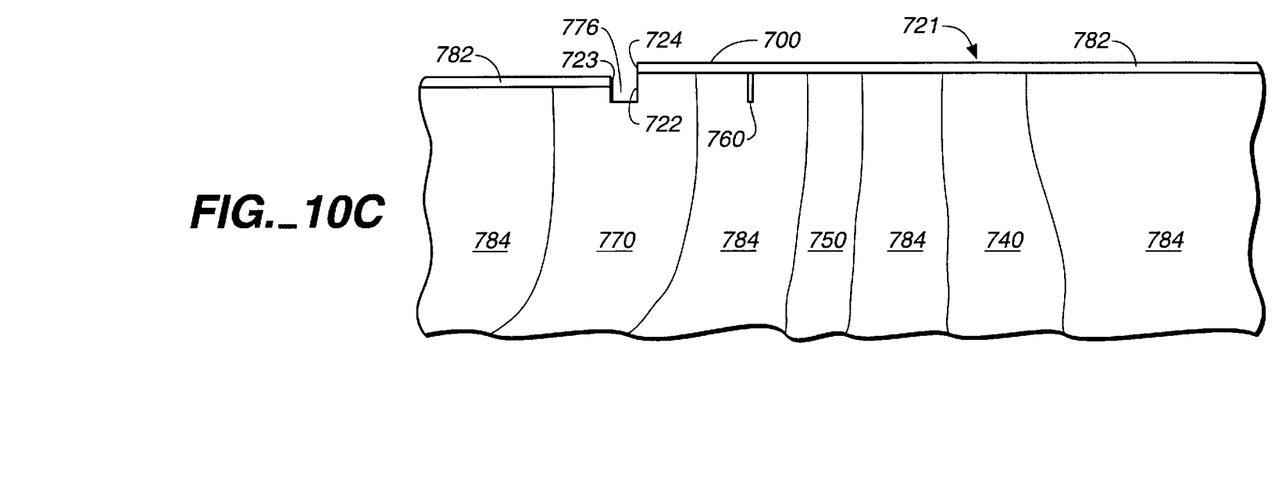
FIG. 10C is a cross sectional view of a portion of a slider containing multiple transducers with a debris barrier in accordance with another embodiment of this invention.

In FIG. 10C, multiple transducer 721 includes the elements of multiple transducer 720 shown in FIG. 10A except that a different barrier cavity 776 is used in this embodiment. Barrier cavity 776 includes a first side surface 723 and a second side surface 722 which has a height greater than a height of first side surface 723. Second side surface 722 has a portion 724 which is higher than first side surface 723. Portion 724 is used by the slider to trim or shave off asperities on a surface of a rotating disk. The trimmed or shaved off portions of the asperities would then collect in barrier cavity 776. This prevents the asperities from contacting MR element 760 thereby reducing the problem of thermal asperities associated with using MR elements in disk drives.

Figure 11A:
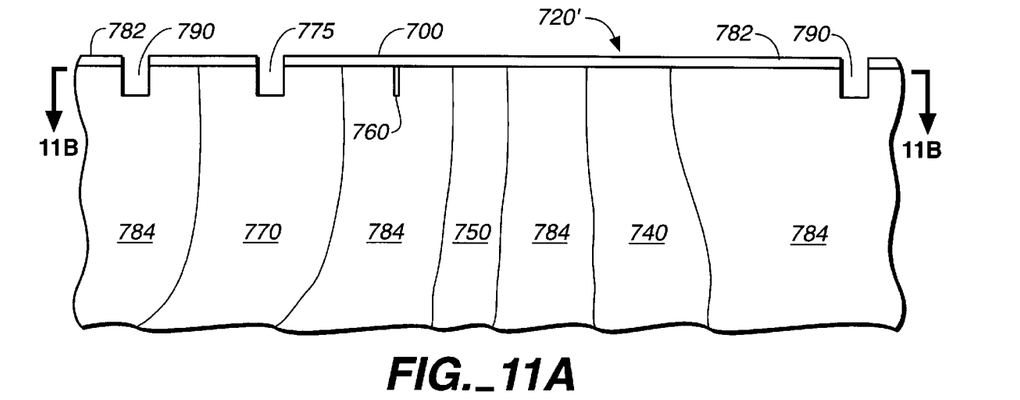
FIG. 11A is a cross sectional view of a portion of a slider containing multiple transducers with a debris barrier in accordance with another embodiment of this invention.
Figure 11B:
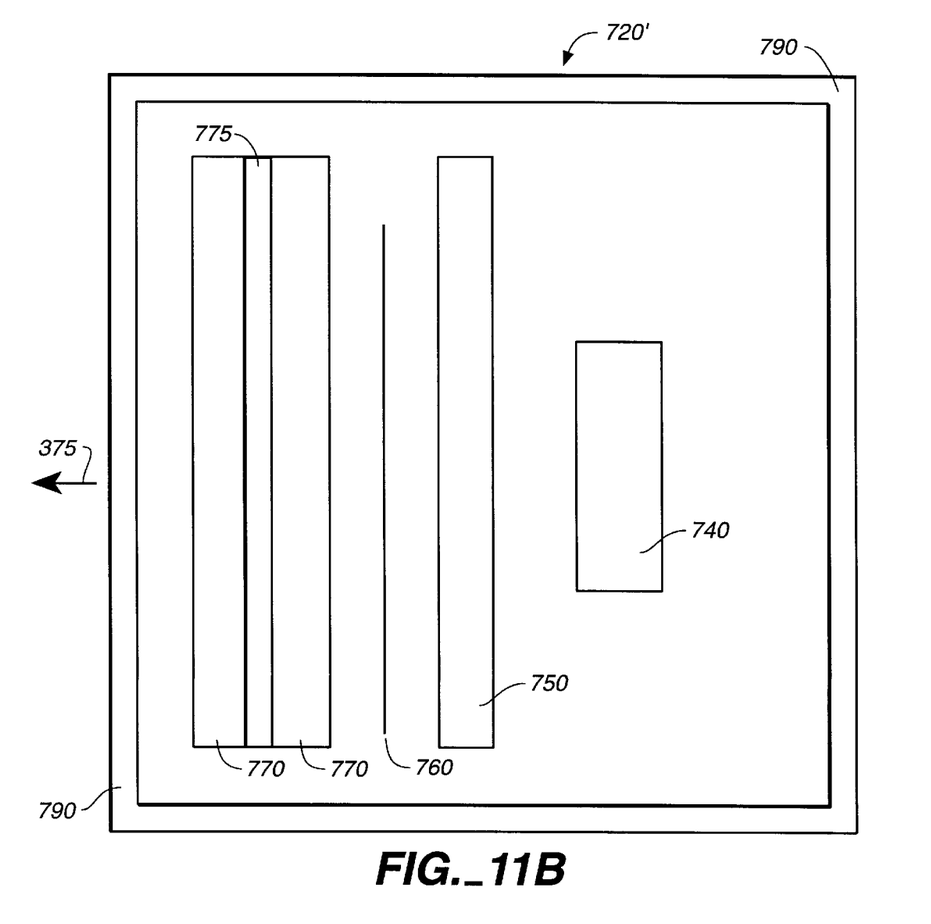
FIG. 11B is a plan view of the portion of FIG. 11A taken along line 11B.

In FIG. 11A and FIG. 11B, a portion of an air bearing slider containing another multiple transducer 720' is shown. Transducer 720' includes the elements of the transducer 720 (of Figure 10B) and also includes a surrounding barrier cavity 790 for debris collection. The barrier cavity 790 is approximately 1 um deep (FIG. 11A) and 1–3 um wide and can completely surround the transducer components (as in FIG. 5C) or only partially surround the transducer components (as in FIG. 7A). FIG. 11A and FIG. 11B show barrier cavity 790 in conjunction with barrier cavity 775; however barrier cavity 790 can also be used in place of barrier cavity 775 in an alternative embodiment.

I claim:

1. An air bearing slider containing a transducer for a hard disk drive, the air bearing slider comprising:
    an air bearing surface;
    a depressed region in the air bearing surface;
    first and second magnetic poles, each magnetic pole having a pole tip region extending away from the depressed region;
    a barrier wall on the air bearing surface surrounding the depressed region;
    the barrier wall including an inner wall surface and an outer wall surface, the barrier wall being spaced-apart from the first and second magnetic poles, each wall surface being perpendicular to the depressed region; and
    a barrier cavity in the air bearing surface disposed adjacent to the barrier wall wherein the barrier wall is between the barrier cavity and the depressed region, the barrier cavity for collecting debris and the barrier wall for preventing debris from migrating into the depressed region.

2. The air bearing slider of claim 1 wherein the barrier wall and material around the barrier cavity are all composed of Alumina and wherein the magnetic poles are composed of a soft magnetic nickel-iron alloy.

3. The air bearing slider of claim 1 wherein the barrier wall and the barrier cavity completely surround the magnetic poles and the depressed region.

4. The air bearing slider of claim 1 wherein the barrier wall and the barrier cavity partially surround the magnetic poles and the depressed region.

5. The air bearing slider of claim 1 wherein the barrier cavity is approximately 1 um deep and approximately 1–3 um wide.

6. The air bearing slider of claim 1 wherein the barrier wall is approximately 1 um tall and approximately 1–3 um wide.

7. An air bearing slider containing multiple transducers for a hard disk drive, the air bearing slider comprising:
    an air bearing surface;
    magnetic poles oriented perpendicular to the air bearing surface;
    a magneto-resistive element disposed adjacent to the magnetic poles;

a shield disposed adjacent to the magneto-resistive element wherein the magneto-resistive element is located between the shield and one pole of the magnetic poles, the shield and the one pole for shielding the magneto-resistive element; and a barrier cavity etched into a top surface of the shield such that the barrier cavity extends along the entire length of the shield, the barrier cavity for collecting debris therein and preventing debris from migrating to the magneto-resistive element.

8. The air bearing slider of claim 7 wherein material surrounding the barrier cavity and the magnetic poles are composed of a soft magnetic nickel-iron alloy.

9. The air bearing slider of claim 7 wherein the magneto-resistive element is approximately 1 micro inch thick.

10. The air bearing slider of claim 7 wherein the barrier cavity is approximately 1 um deep and approximately 1–3 um wide.

11. The air bearing slider of claim 7 wherein the barrier cavity further comprises:

a first side surface and a second side surface wherein a height of the second side surface is greater than a height of the first side surface such that a portion of the second side surface is used to trim asperities on a surface of a rotating disk.

* * * * *